(12) United States Patent
Metz (10) Patent No.: US 11,261,779 B2
(45) Date of Patent: Mar. 1, 2022

(54) TURBINE ARRANGEMENT FOR CONTROLLING A GAS FLOW

(71) Applicant: BorgWarner Inc., Auburn Hills, MI (US)

(72) Inventor: Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/079,977

(22) Filed: Oct. 26, 2020

(65) Prior Publication Data

US 2021/0140363 A1    May 13, 2021

(30) Foreign Application Priority Data

Nov. 13, 2019   (DE) .......................... 102019130621.3

(51) Int. Cl.
*F02B 37/18* (2006.01)
*B60L 50/70* (2019.01)
*F02B 39/10* (2006.01)

(52) U.S. Cl.
CPC ............ *F02B 37/183* (2013.01); *B60L 50/70* (2019.02); *F02B 39/10* (2013.01)

(58) Field of Classification Search
CPC ......... F02B 37/183; F02B 39/10; B60L 50/70
See application file for complete search history.

(56) References Cited

U.S. PATENT DOCUMENTS

| 6,715,288 | B1 * | 4/2004 | Engels ................. F01D 17/143 60/602 |
| 10,033,056 | B2 | 7/2018 | Guidry et al. |
| 10,408,121 | B2 | 9/2019 | Hornbach et al. |

(Continued)

FOREIGN PATENT DOCUMENTS

DE   102012007377 A1   10/2013
DE   102014008931 A1   12/2015
(Continued)

OTHER PUBLICATIONS

Luftersorgung for Brennstoffzellen, D. Metz et al., BorgWarner Library, 2014 (Air Supply for Fuel Cells).

*Primary Examiner* — Audrey B. Walter
*Assistant Examiner* — Edward Bushard
(74) *Attorney, Agent, or Firm* — Howard & Howard Attorneys PLLC (57) ABSTRACT

A turbine arrangement for controlling a gas flow, in particular for a fuel cell (2) or for an internal combustion engine (3), and a charging device having such a turbine arrangement, is described, in which the gas flow supplied by an inlet (10) can be controlled by an adjustable slide bushing (48) covering an entry opening (43) to form a turbine wheel (38) arranged in a turbine housing (30) between a closed position and an open position, such that, in the closed position, the gas flow is throttled and, in the at least partially open position, a controllable proportion of the gas flow drives the turbine wheel (38) arranged on a shaft (22) of an electric engine (18) functioning as a generator for recuperating energy, wherein the slide bushing (48) releases a wall opening (64) in the turbine housing (30) above a predetermined value of the gas flow, such that a bypass channel emerges in order to guide gas flow past the turbine wheel (38) directly to an outlet opening (24).

14 Claims, 6 Drawing Sheets

(56) References Cited

U.S. PATENT DOCUMENTS

| | | | | |
|---|---|---|---|---|
| 2012/0099965 A1* | 4/2012 | Ramb | ................... | F01D 17/105 |
| | | | | 415/145 |
| 2018/0163738 A1* | 6/2018 | Merritt | ................... | F04D 29/051 |
| 2019/0170059 A1* | 6/2019 | Jin | ........................... | F16K 3/262 |

FOREIGN PATENT DOCUMENTS

| | | | |
|---|---|---|---|
| EP | 3142177 | A1 | 3/2017 |
| EP | 2952748 | B1 | 10/2018 |

* cited by examiner

TURBINE ARRANGEMENT FOR CONTROLLING A GAS FLOW

CROSS-REFERENCE TO RELATED APPLICATIONS

This application claims the benefit of German Patent Application No. 102019130621.3 filed Nov. 13, 2019 the disclosure of which is herein incorporated by reference in its entirety.

The invention relates to a turbine arrangement for controlling a gas flow, in particular for a fuel cell or for a combustion engine, and moreover a charging device having such a turbine arrangement.

Vehicles that do not generate any emissions while operating are necessary for adjusting to future exhaust gas regulations and the general desire for lower $CO_2$ emissions. Electric vehicles and fuel cell vehicles have a positive impact on the carbon footprint of car manufacturers. Since the range of battery-powered electric vehicles is limited and a significant breakthrough in terms of battery technology to increase the range is difficult, vehicles with fuel cells can constitute a way to drive for an acceptable range without producing emissions.

Fuel cells are inherently known from the general prior art. Fuel cells or, usually, fuel cell systems having several individual cells make an emission-free output of electrical power possible by merging oxygen from the air and hydrogen. Such cells comprise an anode and a cathode having a membrane lying in between. The supply of air usually takes place by means of a compressor, which can be powered electrically. The air supply of fuel cells is the subject of enormous development efforts. An overview of a fuel cell system to be used in vehicles is found in the publication: "D. Metz et al., Luftversorgung für Brennstoffzellen, BorgWarner Knowledge Library, 2014" (Air Supply for Fuel Cells). There, the use of an electric engine arranged on the side of the compressor is also explained.

A fuel cell system having at least one fuel cell is described in DE 10 2012 007 377 A1, said fuel cell system having an anode chamber and a cathode chamber, having an inlet air line for an airflow to the cathode chamber and having an outlet air line for an airflow out of the cathode chamber, wherein an air conveyor device is arranged in the inlet air line. A pulsation device is arranged in the region of the airflow to and/or from the cathode chamber, by means of which pulsation device pressure, speed and/or volume flow rate of the airflow can be changed in a pulsating manner.

A fuel cell controller using loss retrieval systems is known from EP 3 142 177 A1, in which controlling the counter-pressure or the air humidity of the fuel cell is depicted in combination with a through-flow control arrangement, which retrieves the energy resulting from the controller. A turbine coupled to a generator is shown as the through-flow control arrangement. A vehicle system includes a fuel cell stack, a through-flow valve for controlling a fluid flow emerging from the fuel cell stack and a through-flow control device parallel to the through-flow control valve, in order to generate electrical energy as a reaction to a bypass section of the fluid flow, which circumvents the through-flow control valve based on an alignment of the through-flow control valve in relation to the fluid flow.

Furthermore, it is known from this publication to determine an optimal level of air humidity in order to operate the fuel cell most efficiently, and to compare the current humidity measurement with this desired humidity value. In a fuel cell, a counter-pressure at the outlet can be accordingly reduced, which makes a less limited outlet flow possible at the cathode, which is able to reduce the air humidity at a cathode. Similarly, the counter-pressure can be increased, which in turn limits the outlet flow at the cathode, in order to facilitate the increase of the air humidity of the cathode.

It is known from DE 10 2014 008 931 A1 that the exhaust gas turbocharger no longer generates a charging pressure lying above the desired suction pipe pressure, but rather the charging pressure appropriate for the load ratio of the internal combustion engine as a result of the electric engine removing the excessive energy. Thus, the throttle valve can be completely opened in the partial load operation, and the internal combustion engine works virtually without throttle losses in the air-intake system. An intelligent control of the removal and supply of the energy is controlled via a controlling unit and corresponding algorithms. The energy level to be removed can be actively influenced by an additional targeted control of a waste gate position.

Based on this prior art, the inventor(s) were set the object of achieving a further improvement of the control of a gas flow for a fuel cell or for an internal combustion engine with reduced component expense during operation.

This object is solved by the features of claim 1. Further advantageous designs of the invention are respectively the subject matter of the sub-claims. These can be combined with one another in a technologically meaningful manner. The description, in particular in conjunction with the drawings, additionally characterises and specifies the invention.

According to the invention, a turbine arrangement for controlling a gas flow, in particular for a fuel cell or for an internal combustion engine, is specified, in which the gas flow provided by an inlet can be controlled by an adjustable slide bushing covering an inlet opening to form a turbine wheel arranged in a turbine housing between a closed position and an open position, such that, in the closed position, the gas flow is throttled, and, in the at least partially open position, a controllable proportion of the gas flow drives the turbine wheel that is arranged on a shaft of an electric engine functioning as a generator for recuperating energy, wherein the slide bushing releases a wall opening in the turbine housing above a predetermined value of the gas flow, such that a bypass channel emerges in order to guide gas flow past the turbine wheel directly to an outlet opening.

The turbine arrangement according to the invention constitutes a very compact component, in which the otherwise common throttles are additionally combined with an electric recuperation function by changing the current cross-section before the turbine wheel. Furthermore, it is possible to create an indirect recuperation of exhaust gas energy via the air path by an expansion to the target suction pipe pressure taking place by means of the turbine arrangement.

The turbine arrangement according to the invention here uses the slide bushing that is changeable in relation to the turbine housing and which is guided positionally variably, such that the wall opening on the turbine housing can be changed to the desired size. Here, the wall opening constitutes a changeable cross-section of the bypass channel, wherein, with a completely closed wall opening, the exhaust gas flow is completely blocked and is not guided to the outlet opening by the turbine wheel. By gradually opening the wall opening, i.e. adjusting the slide bushing in relation to the wall opening, an increasing enlargement of the cross-section of the wall opening now takes place, such that a larger part of the exhaust gas flow reaches the outlet opening. From a predetermined threshold, the gas flow is guided via the bypass channel to the outlet opening, without driving the turbine wheel in advance. The turbine wheel is arranged on the shaft of the electric engine, wherein the design of the electric engine itself is not the subject matter of this invention. Preferably, the electric engine is provided as a brushless direct current engine, which comprises corresponding housing components, such as engine housing, rear wall and receiving chamber, such that corresponding seals or pressure equalisers are possible. Such an electric engine has been described in EP 2 952 748 B1, for example, by the same applicant. With minimal modifications, the electric motor described there can also be used in the turbine arrangement according to the present invention.

According to an embodiment of the invention, the gas flow is the exhaust gas flow of a fuel cell.

Accordingly, the current cross-section and here, as already described at the start, also the counter-pressure can be changed in a fuel cell in the event of changing load ratios specifically via the turbine arrangement without here having to provide a throttle valve or similar, since the constriction at the outlet of the fuel cell takes place by means of the adjustable outer casing, wherein the outer casing can deflect the exhaust gas flow both directly past a turbine wheel and on the turbine wheel via a bypass channel to the outlet opening. By continuously changing the outer casing, it is possible to vary the current cross-section across a large region, such that, along with the desired adaptation of the counter-pressure inside the fuel cell, a recuperation of energy of the exhaust gas flow can also be achieved by this driving the electric engine using the turbine wheel, such that electrical energy can be retrieved from the exhaust gas flow.

According to a further embodiment of the invention, the gas flow is the fresh air flow on the suction side of an internal combustion engine.

The turbine arrangement according to the invention is also advantageous when used in an internal combustion engine in order to correspondingly control the fresh air flow in the inlet region. According to the invention, fresh air is supplied to the turbine arrangement at the inlet, such that the gas flow supplied to the air inlet via the outlet can be controlled by means of the turbine arrangement. The turbine arrangement thus controls the gas flow of the fresh air on the suction side in the event of an internal combustion engine, wherein here the throttle valve can also be dispensed with and energy retrieval from the air flow can take place.

According to a further embodiment of the invention, the adjustment of the slide bushing takes place by means of an axial shifting or by means of a rotation around a longitudinal axis in relation to the wall opening.

The part of the gas flow that is guided through the turbine thus runs on the inner side, while the part of the gas flow that is guided past the turbine wheel is guided by the turbine housing through the wall opening to the outlet opening. Here, it can also be provided that several wall openings, in particular distributed uniformly across the periphery, are also provided on the turbine housing. Usually, the wall openings are here provided with a cross-section that is changeable in the axial direction, such that a triangular course emerges, for example, which leads to a more exact adjustability of the part of the gas flow that is led through the bypass channel. Adjustment can here take place by axial shifting or rotation of the slide bushing.

According to a further embodiment of the invention, the inlet opening annularly surrounds a plurality of guide blades, which enable an adaptation of a current cross-section from the outlet to the turbine wheel.

Such a design is known in exhaust gas turbo chargers for internal combustion engines, for example, wherein the guide blades ensure an improvement of the flow behaviour of the turbine wheel. Here, the design of the guide blades is correspondingly chosen, wherein, along with a wing-shaped design, a shape of the guide blades can also be chosen which is reduced or shortened across the periphery in the axial direction. Similarly, a large connection radius can be chosen in order to achieve as good and low-loss a current guide as possible in the extensively closed region by an adaptation from an angular to a round current cross-section being undertaken.

According to a further embodiment of the invention, the plurality of guide blades is integrated in the rear wall or the engine housing or fixed via an insertion plate.

That is to say, the guide blades are not usually designed as separate inlays, but rather are integrated in the rear wall or the engine housing; however, the invention can also be applied in a two-part arrangement. Here, the guide blades can be fixed to the rear wall or the engine housing via an insertion plate, wherein it is provided in particular to fix the insertion plate directly to the rear wall that separates the turbine arrangement from the engine housing of the electric engine, wherein the shaft is guided through the rear wall.

According to a further embodiment of the invention, the slide bushing has a receiving chamber for the plurality of guide blades on its first edge adjacent to the wall opening, said receiving chamber spanning the plurality of guide blades. The receiving chamber can be designed as an axially circumferential annular groove or with recesses complementary to the guide blades.

The receiving chamber, formed either as an axially circumferential annular groove or having recesses complementary to the guide blades, thus constitutes the counterpart to the guide blades, such that, with a completely closed slide bushing, the inlet opening on the turbine housing is also closed. With the variant with the annular groove, in the event of a completely closed slide bushing, in comparison to the design with recesses complementary to the guide blades, a larger residual amount of exhaust gas flow is guided through the turbine wheel, yet the construction is simpler.

According to a further embodiment of the invention, the slide bushing has a radially circumferential annular groove on its second edge, which is coupled to an adjustment device. The adjustment device can here be designed with an adjustment fork engaging in the radially circumferential annular groove. Accordingly, a simple adjustment possibility is created by axial displacement of the slide bushing by this being displaced via the adjustment fork in the direction of the outlet opening for complete opening or in the direction of the rear wall for complete closing.

According to a further embodiment of the invention, the inner side of the slide bushing is formed with positive engagement with the turbine housing or an inner bushing. Here, an abutment can be formed on the turbine housing or the inner bushing, said abutment limiting the adjustment of the slide bushing via a complementary abutment.

Here, it is provided, in particular, to form the inner side of the slide bushing with positive engagement with the turbine housing or an inner bushing, such that the slide bushing can glide over the turbine housing or the inner bushing in this region. Here, one or more seals can be provided on the slide bushing, which ensure an additional sealing in the region of the gliding faces, preferably on their ends. Such seals could be designed in the shape of O-rings, for example, which are inserted into recesses suitably shaped for this on the slide bushing and/or on the turbine housing or the inner bushing.

It can also be provided to form an abutment on the turbine housing or the inner bushing, said abutment being able to limit the adjustment of the slide bushing via a complementary abutment.

In this way, a safe guiding of the slide bushing in the turbine housing or the inner bushing is made possible, such that a reliable adjustability can also be ensured over a longer operating duration.

Furthermore, a charging device is specified, which is provided with a turbine arrangement, as described above, wherein one or more compressors are moreover provided for supplying air.

A charging device for fuel cells can also be provided with multi-stage compressors without separate turbines, wherein such a device can be combined with the turbine arrangement according to the invention.

Here, the compressor(s) can be driven with the electric engine attached on the shaft of the turbine arrangement, such that this can perform the function as a generator for the turbine or electric engine for the compressor. The electrical energy emitted by the generator is here guided back to the system, while the sealing by means of a compressor driven by an electric engine is advantageous with fuel cells, since, because of the low temperature level, its exhaust gas enthalpy is usually too low to drive the compressor alone.

Moreover, such a charging device having the turbine arrangement according to the invention can be designed with a control electronics system, which controls the adjustment device of the turbine arrangement or the power output or power consumption of the electric engine for the compressor, such that an adaptation to the current driving situation is achieved via the control unit, wherein the control device is usually designed in such a way that the fuel cell has an optimal degree of efficiency.

Furthermore, the charging device having the turbine arrangement according to the invention can control an air mass flow at an air inlet by means of the electric engine and/or the damming of the exhaust gas flow at the outlet by means of the control circuit.

In general, an expander is described that can both recuperate and boost. This can be introduced on an internal combustion engine, yet could also be used on a fuel cell for starting or supporting. This is conceivable, in particular, with a design using an axial wheel. This can be achieved via special current paths and/or switching valves but is also possible as an axial machine without additional inversion of the current flow only via rotational speed variation, such that a simple and compact construction of such an expander emerges.

Individual exemplary embodiments are explained in more detail below by means of the drawings. Here are shown.

In the figures, identical or functionally identically acting components are provided with the same reference numerals.

Figure 1A:
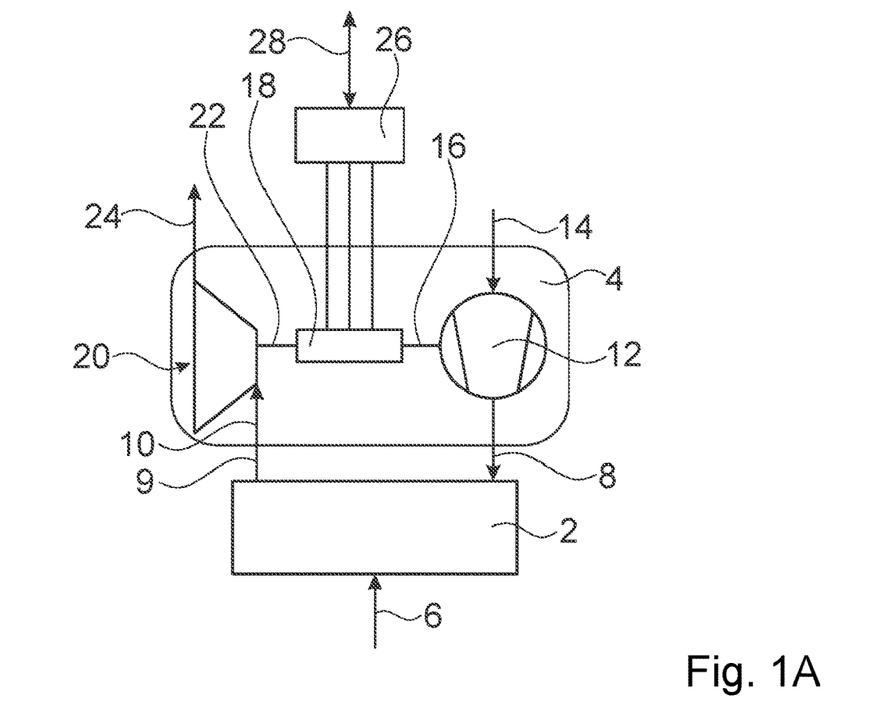
FIG. 1A, schematically, a block diagram of a system having a fuel cell and a charging device according to the invention, FIG. 1B, schematically, a block diagram of a system having an internal combustion engine and a turbine arrangement according to the invention, FIG. 2 a section through a turbine arrangement according to the invention, FIG. 3 an inner bushing of the turbine arrangement according to FIG. 2 in a perspective side view, FIG. 4A a slide bushing for a turbine arrangement according to FIG. 2 in a sectional view, FIG. 4B a slide bushing for a turbine arrangement according to FIG. 2 in a side view, FIG. 4C a further slide bushing for a turbine arrangement according to FIG. 2 in a side view, FIG. 5 an insertion plate having guide blades for the turbine arrangement according to FIG. 2 in a perspective side view, and FIG. 6 a section through an expander according to the invention.

Referring to FIG. 1A first of all, a system, comprising a fuel cell 2, is illustrated, which is coupled with a charging device 4. The fuel cell has a hydrogen supply 6 and an air supply 8, wherein, after a corresponding reaction inside the fuel cell 2, moistened air is emitted via the outlet 9. The air supply 8 is connected to a compressor 12 which is a component of the charging device 4. The compressor 12 has an air inlet 14, which sucks air from the surroundings. The compressor 12 is connected to an electric engine 18 via a shaft 16, said electric engine being able to correspondingly move the compressor 12 in the rotational direction.

On the outlet side, the outlet 9 is connected to an inlet 10 of the turbine arrangement 20, which also creates a connection with a shaft 22 to the electric engine 18, which can thus emit electrical power via the turbine arrangement 20 operated as the generator. The exhaust gas flow leaves the turbine arrangement 20 via an outlet opening 24. The electric engine 18 is controlled or regulated by a control electronics system 26, such that this can receive both energy from an external current source (not shown in FIG. 1A) or can emit at this, as is schematically indicated in FIG. 1A by means of the bidirectional connection 28. Furthermore, in a two-stage variant of the charging, a further electric engine (not shown in FIG. 1A) can also drive an additional, pre-switched compressor (not shown in FIG. 1A). Here, in particular the e-booster described at the start according to EP 2 952 748 B1 could be used.

Accordingly, the current cross-section and here also the counter-pressure in the fuel cell 2 can be specifically changed via the turbine arrangement 20 in the event of changing load ratios, without a throttle valve or similar having to be provided here. In the case of a fuel cell 2, the constriction at the outlet 9 of the fuel cell 2 via the turbine arrangement 20 controls the gas flow of the exhaust gas and will be explained below in yet more detail with reference to FIGS. 2 to 5.

Figure 1B:
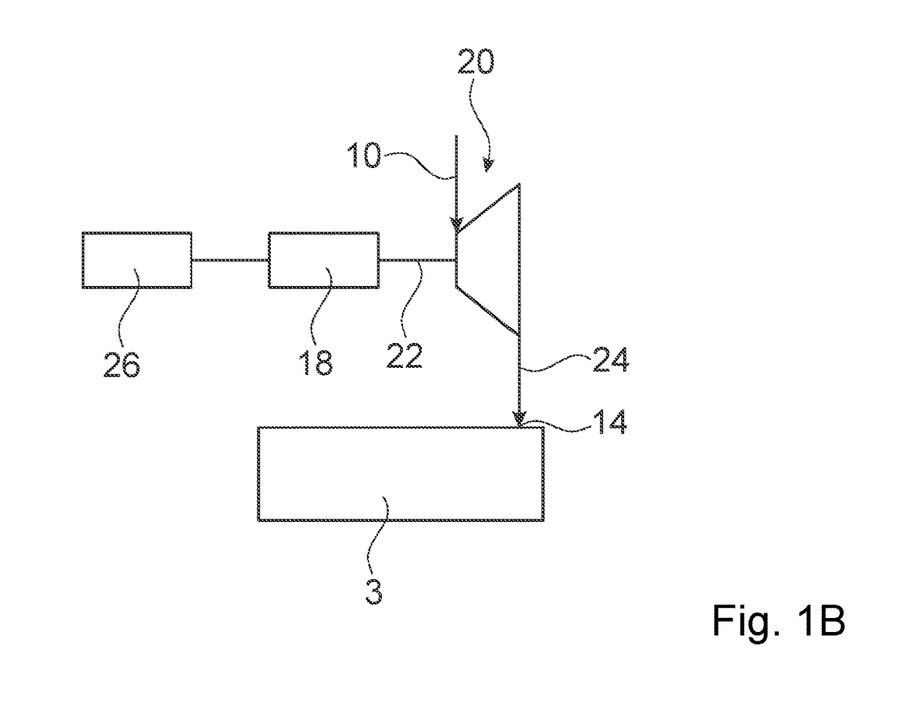

In other embodiments, the turbine arrangement 20 can also be used in an internal combustion engine 3, as is explained with reference to FIG. 1B. With the internal combustion engine 3, the adaptation to changing load ratios takes place on the inlet side, for which a throttle valve is usually used in the prior art, in order to control the fresh air flow. According to the invention, fresh air is supplied to the turbine arrangement 20 at the inlet 10, such that the gas flow supplied to the air inlet 14 via the outlet 24 can be controlled by means of the turbine arrangement 20. In the case of an internal combustion engine 3, the turbine arrangement 20 thus controls the gas flow of the fresh air on the suction side, wherein the throttle valve can also be dispensed with here. The fresh air flow leaves the turbine arrangement 20 via an outlet opening 24. The turbine arrangement 20 is in turn coupled to the electric engine 18 via the shaft 22, such that, driven by the turbine arrangement 20, the electric engine 18 operated as the generator can emit electrical power. The electric engine 18 is controlled or regulated by the control electronics system 26.

Next, the turbine arrangement 20 can control both the gas flow on the outlet side when used with a fuel cell 2 and on the inlet side when used with an internal combustion engine 3, without here using the throttle valve from the prior art and simultaneously retrieving energy from the gas flow of the exhaust gas via the electric engine or fresh air. Details of the turbine arrangement 20 are described below. The explanations apply in both cases, wherein gas flow can optionally mean exhaust gas or fresh air, depending on the usage scenario.

Figure 2:
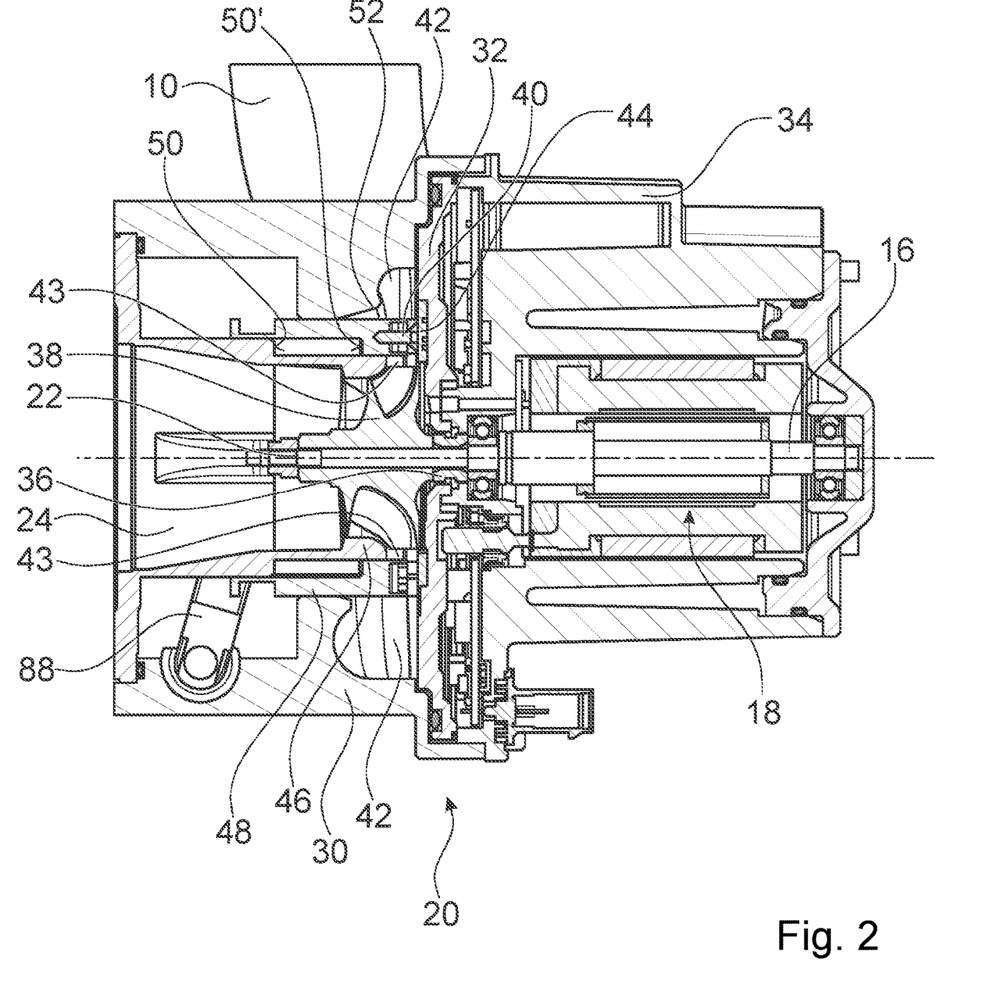

With reference to FIG. 2, the turbine arrangement 20 is explained in more detail below. In FIG. 2, the turbine arrangement 20 is shown in a cross-sectional view, wherein the cross-sectional plane is arranged approximately centrally in relation to the shaft 22.

The turbine arrangement 20 shown in FIG. 2 has a turbine housing 30 that is connected to a housing 34 of the electric engine 18 via a rear wall 32. By means of the rear wall 32, the shaft 22 is guided via a suitable seal 36, said shaft having a turbine wheel 38 on the side of the turbine housing 30. The turbine wheel 38 is connected to an entry region 42 via a plurality of guide blades 40, said entry region being attached to the inlet 10 formed in the shape of a volute and being connected to the inlet 10. Then the gas flow can be guided from the inlet 10 via the entry region 42 past the guide blades 40 to the inlet opening 43, such that the gas flow strikes the turbine wheel 38 and moves the shaft 22 in a rotational movement, such that the electric engine 18, in this case operated as a generator, can emit electrical energy.

Here, the guide blades 40 are arranged on an insertion plate 44, which is fixed to the rear wall 32. However, the guide blades 40 can also be fixed directly on the rear wall 32. The rear wall 32 can also be an integral part of the housing 34 of the electric engine 18, on which the guide blades 40 are arranged. A complementary arrangement of the guide blades 40 on the slide bushing 48 is also possible.

With the turbine arrangement 20, the gas flow supplied by the inlet 10 can be controlled by an adjustable slide bushing 48 by this covering the inlet opening 43 between a closed position and an open position, such that, in the closed position, the gas flow is throttled and, in the at least partially open position, a controllable proportion of the gas flow drives the turbine wheel 38 to recuperate energy. The gas flow is guided via the turbine wheel 38 to the outlet opening 24. Then, in the closed position, the gas flow is completely throttled and, in the at least partially open position, a controllable proportion of the gas flow strikes the turbine wheel 38 to recuperate energy. The slide bushing 48 releases a wall opening in the turbine housing 30 above a predetermined value of the gas flow, such that a bypass channel emerges in order to guide gas flow directly past the turbine wheel 38 to an outlet opening 24.

The outer region of the turbine wheel 38 is limited by an inner bushing 46, which is surrounded by the slide bushing 48. Here, the slide bushing 48 can be axially displaced in relation to the inner bushing 46, wherein, in FIG. 2, the slide bushing 48 is shown in a completely shifted-in position in which the gas flow from the inlet 10 is blocked via the inlet region 42 to the inlet opening 43, such that it cannot reach through the turbine wheel 38 to the outlet opening 24. The inner bushing 46 is shown here as a separate component but can also form an integral component of the turbine housing 30. The remarks below relating to the design of the inner bushing are thus also to be understood analogously for the design as an integral component of the turbine housing 30.

In the completely pulled-out position of the slide bushing 48, a bypass channel is opened, which leads from the entry region 42 via wall openings (detailed description below) in the inner bushing 46 to the outlet opening 24. For this, the turbine housing 30 in the region of the entry region 42 is designed with a conically tapering wall section 52, which defines the cross-sectional opening of the bypass channel with the maximally open position of the slide bushing 48.

Figure 3:
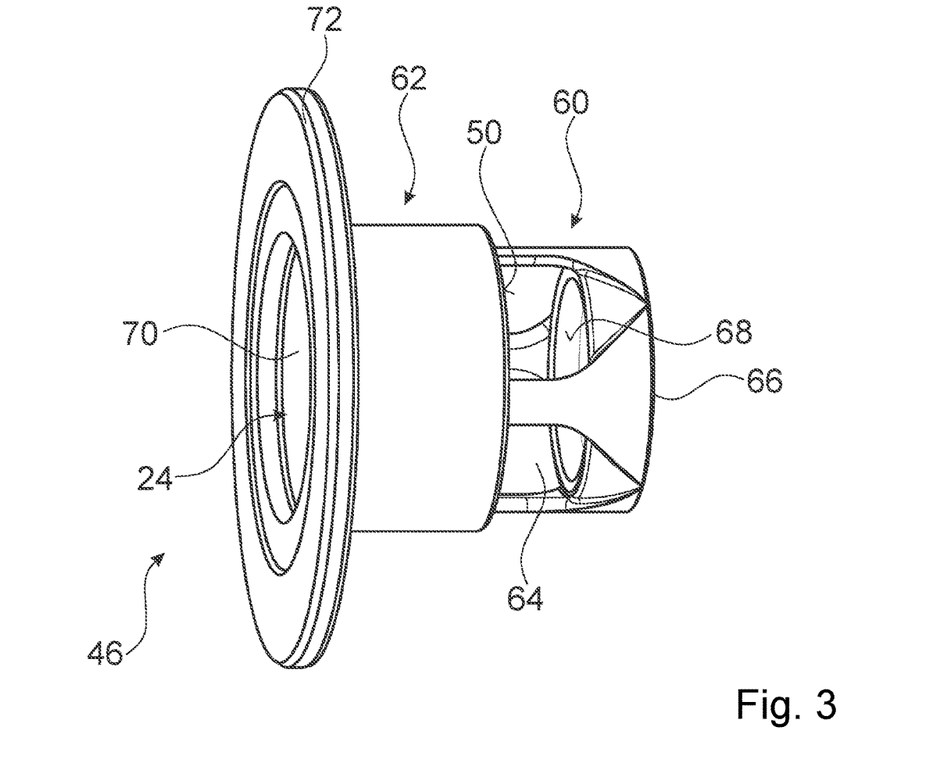

With reference to FIG. 3, the inner bushing 46 is depicted individually. It can be seen that it has a first wall segment 60, to which a second wall segment 62 is attached via the abutment 50. Several wall openings 64 are formed on the first wall section 60, which are formed in the shape of a triangle, in particular on an inner edge 66 facing towards the entry opening 43, in order to enable a more precise adjustment of the current cross-section of the gas flow. On its inner side 68, first wall segment 60 surrounds the outer region of the turbine wheel 38 (see FIG. 2). On its inner side 70, the second wall segment 62 is typically designed conically and merges into the outlet opening 24. The inner bushing 46 has an end flange 72 on its outer end, via which end flange the inner bushing 46 is connected to the turbine housing 30.

As already mentioned, the inner bushing 46 can also be a component of the turbine housing 30, wherein the wall openings 64 are formed in the turbine housing 30, and the slide bushing 48 is guided in sections in a form-fit manner via the turbine housing 30. Seals can also be arranged between the slide bushing 48 and the inner bushing 46 or the turbine housing 30.

Figure 4A:
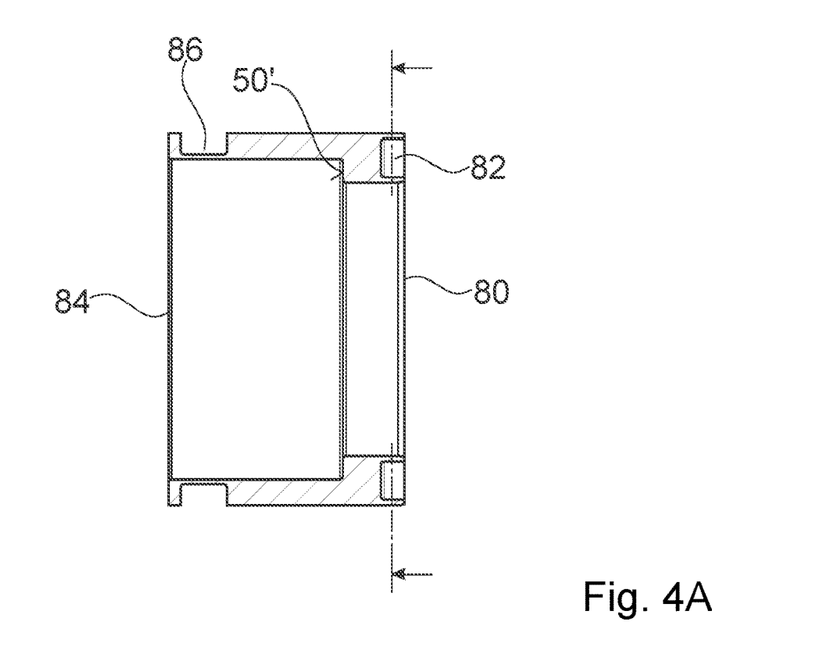

In FIG. 4A, the slide bushing 48 is shown in a sectional depiction. It can be seen that the slide bushing is provided with a receiving chamber on its first edge 80 in the form of an axially circumferential annular groove 82, which is designed in terms of its dimensions in such a way that the guide blades 40 depicted in FIG. 2 are spanned. On its second edge 84, the slide bushing 48 has a radially circumferential annular groove 86, which is coupled with an adjustment device, in order to be able to shift the slide bushing 48 via the inner bushing 46. To do so, (see FIG. 2) a displaceable adjustment fork 88, for example, is provided, whose fork ends are in engagement with the radially circumferential annular groove 86, such that the slide bushing 48 can be shifted via the inner bushing 46 by displacing the adjustment fork 88. On its inner side, the slide bushing 48 has a complementary abutment 50', such that the movement of the slide bushing 48 outwardly across the inner bushing 46 or the turbine housing 30 is limited. The slide bushing 48 here glides in a form-fit manner, in particular across the region of the first wall segment 60 of the inner bushing 46 or the turbine housing 30 and across a cylindrical section in front of the end flange 72 on the second wall section 62.

Figure 4B:
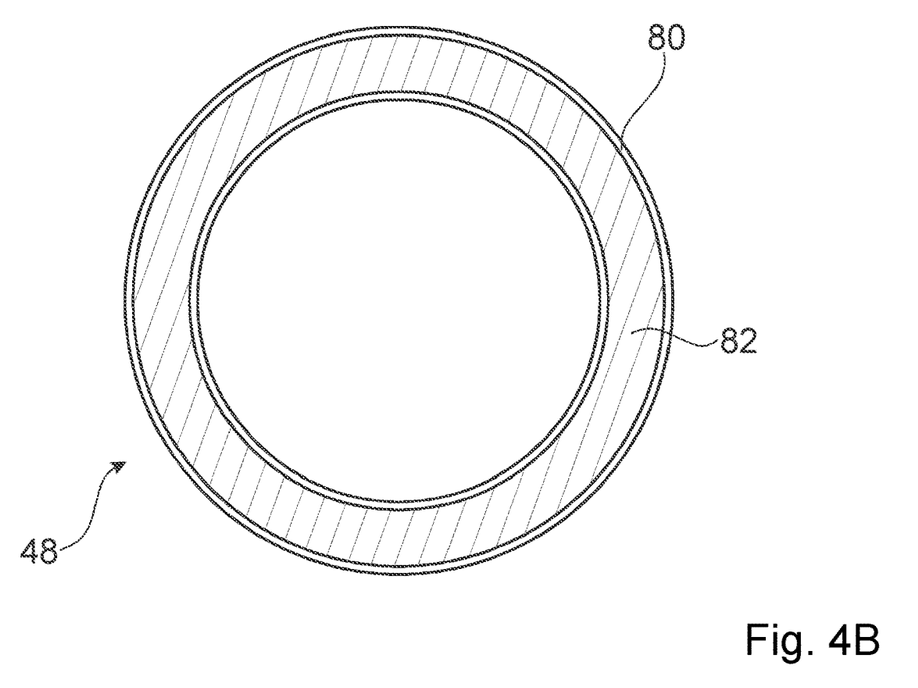

FIG. 4B shows the receiving chamber in the form of the axially circumferential annular groove 82, again in a top view. The dimensions of the axially circumferential annular groove 82 are chosen here in such a way that the guide blades 40 are spanned by it.

Figure 4C:
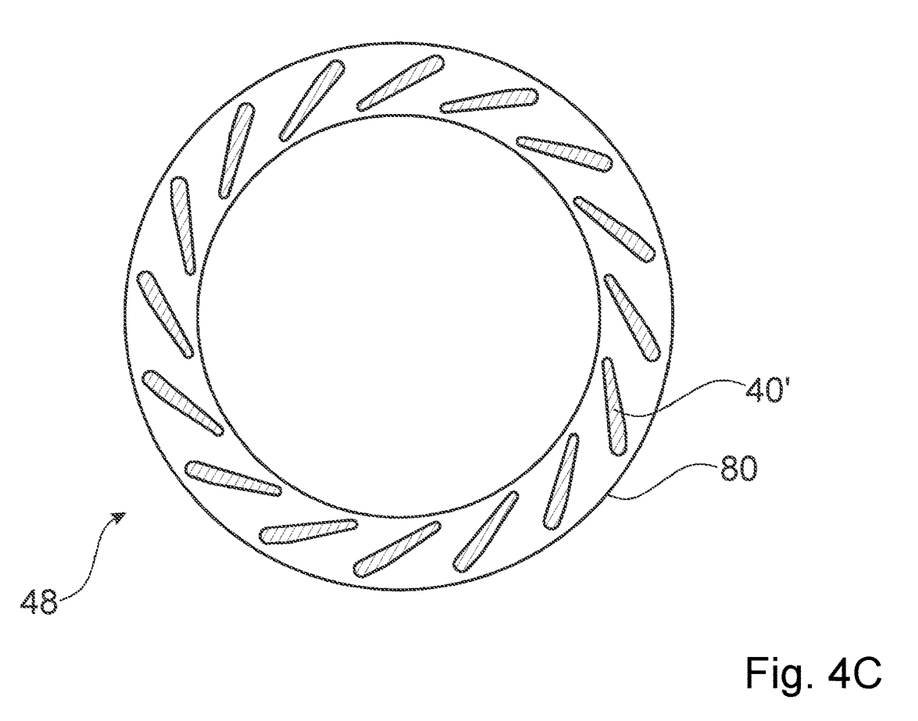

In FIG. 4C, a variant of the slide bushing 48 is shown in which the receiving chamber is formed complementarily to the shape of the guide blades 40, such that an improved closure by means of the slide bushing 48 is possible.

It should be mentioned that a complementary construction in which the guide blades 40 are arranged on the slide bushing 48 would also be possible.

Figure 5:
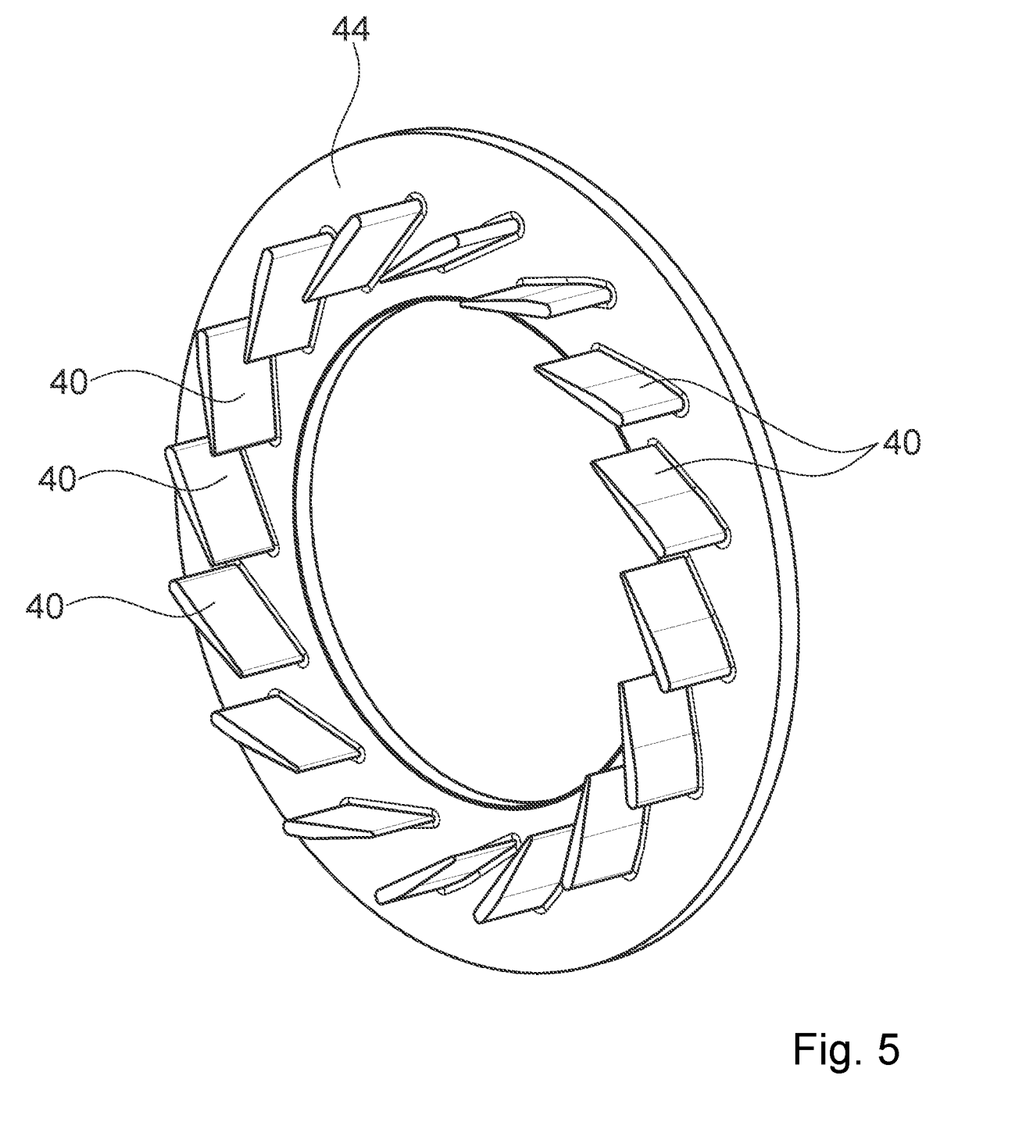

With reference to FIG. 5, the insertion plate 44 having the guide blades 40 is shown below. It can be seen that the plurality of guide blades 40 are fixedly mounted on the insertion plate 44, such that the flow of the gas flow through the turbine wheel 38 is improved. However, the plurality of guide blades 40 can also be arranged directly on the rear wall 32, without providing a separate insertion plate.

The turbine arrangement 20 shown in FIG. 2 is thus suitable for recuperating kinetic energy of the gas flow via the inlet 10, wherein the current cross-section of the gas flow can be specifically adjusted by shifting the slide bushing 48 in order to generate a corresponding counter-pressure inside the fuel cell 2 without here relying on the throttle valve. Together with the electric engine 18, which can also be used to generate a rotational movement of the compressor 12, adjusting an optimal degree of efficiency is also possible, since the emission of electrical energy via the recuperation function and setting a target suction pipe pressure for the indirect recuperation can also take place. A use on the suction side of an internal combustion engine 3 can also be advantageously achieved.

Figure 6:
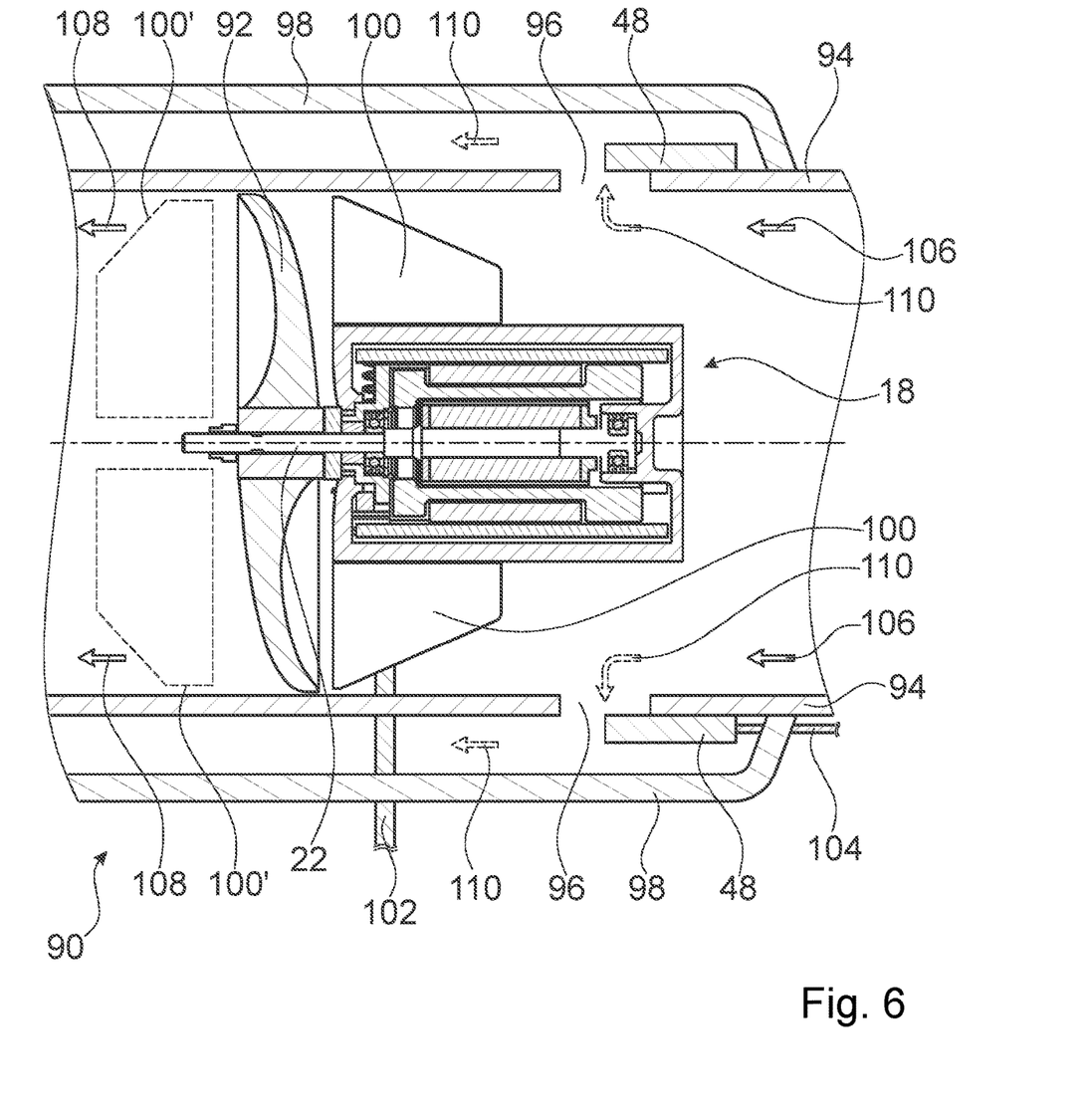

In FIG. 6, an expander 90 is shown in a sectional view, which constitutes a generalisation of the turbine arrangement 20 described up to now as a gas expansion machine. The expander 90 has the electric motor 18 already described, which can both drive the shaft 22 and can function as a generator via a rotational movement of the shaft 22. The shaft 22 is connected to an axial wheel 92. If the electric engine 18 drives the shaft 22, the axial wheel 92 ensures a further seal of a gas flow. However, a recuperation can also take place by the electric engine 18 operated as a generator being driven via the shaft 22 by the axial wheel 92 using a gas flow. The expander 90 can thus recuperate energy from the gas current and additionally seal the gas current.

In order to be able to lead the gas current through the axial wheel 92, a cylindrical wall 94, for example, is provided which is provided with a wall opening 96 upstream in the region of the electric engine 18, said wall opening being able to be influenced by the slide bushing 48 in relation to its opening cross section. The part of the gas current emerging through the wall opening 96 is guided past the axial wheel 92, wherein the bypass channel, for example, is formed by a further outer wall 98, which surrounds the wall 94. Additionally, several pre-guide blades 100, only schematically depicted in FIG. 6, can be arranged upstream in the region of the electric engine 18, which are variable in terms of their orientation, as is already common for example in the turbochargers known in the field of internal combustion engines having variable turbine geometry in the form of VTG cartridges or similar.

It is only schematically shown in FIG. 6 that the pre-guide blades 100 can be correspondingly changed via an adjustment device 102. A further adjustment device 104 is also provided to actuate the slide bushing 48. The adjustment device 102 and the further adjustment device 104 can be coupled to suitable actuators. In summary, the expander 90 is formed in such a way that a gas flow 106 strikes the pre-guide blades 100 past the electric engine 18 and subsequently penetrates the axial wheel 92, such that the gas flow is diverted, as is indicated in FIG. 6 by means of the further gas flow 108. Depending on the position of the slide bushing 48, an additional bypass flow 110 can be set, which leads the gas flow 106 past the expander 90 from a predetermined limit. In other embodiments, a further arrangement of post-guide blades 100' can also be provided, which are arranged downstream of the axial wheel 92 in addition to or instead of the pre-guide blades 100 and can also be correspondingly changed via an adjustment device not depicted in FIG. 6.

The expander 90 described in conjunction with FIG. 6 can be used, in particular, in combination with a fuel cell or also an internal combustion engine, wherein here the gas flow 106 can be used both as an air inlet flow and as a gas flow. Accordingly, it is possible to carry out both energy for recuperation and a power increase. Thus, such an expander 90 could be used, for example, in combination with a fuel cell for starting or supporting in certain driving situations. Such a use in the region of the air inlet does not necessitate an additional inversion of the current guide, wherein there is a controllability of the expander 90 via the variation of the rotation speed of the electric engine 18.

The features specified above and in the claims and that can be seen in the drawings can be advantageously implemented both individually and in different combinations. The invention is not limited to the described exemplary embodiments but can be modified in many ways within the scope of the ability of the person skilled in the art.

LIST OF REFERENCE NUMERALS 2 fuel cell
3 internal combustion engine
4 charging device
6 hydrogen supply
8 air supply
9 outlet
10 inlet
12 compressor
14 air inlet
16 shaft (turbine)
18 electric engine
20 turbine arrangement
22 shaft (compressor)
24 outlet opening
26 control electronics system
28 connection
30 turbine housing
32 rear wall
34 housing
36 seal
38 turbine wheel
40 guide blades
40' complementary recess
42 inlet region
43 entry opening
44 insertion plate
46 inner bushing
48 slide bushing
50 abutment
50' complementary abutment
52 wall portion
60 first wall segment
62 second wall segment
64 wall opening
66 inner wall
68 inner side of first wall segment
70 inner side of second wall segment
72 end flange
80 first edge
82 axially circumferential annular groove
84 second edge
86 radially circumferential annular groove
88 adjustment fork
90 expander
92 axial edge
94 wall
96 wall opening
98 outer wall
100 pre-guide blade
100' post-guide blade
102 adjustment device
104 further adjustment device
106 gas flow
108 further gas flow
110 bypass flow

The invention claimed is:

1. A turbine arrangement for controlling a gas flow, in particular for a fuel cell (2) or for an internal combustion engine (3), comprising an inlet (10), an adjustable slide bushing (48), an entry opening (43), wherein the gas flow supplied from the inlet (10) can be controlled by the adjustable slide bushing (48) covering the entry opening (43) to form a turbine wheel (38) arranged in a turbine housing (30) between a closed position and an open position, such that, in the closed position, the gas flow is throttled and, in the at least partially open position, a controllable proportion of the gas flow drives the turbine wheel (38) arranged on a shaft (22) of an electric engine (18) functioning as a generator for recuperating energy, wherein the slide bushing (48) releases a wall opening (64) in the turbine housing (30) above a predetermined value of the gas flow, such that a bypass channel emerges in order to guide gas flow past the turbine wheel (38) directly to an outlet opening (24), wherein the entry opening annularly surrounds a plurality of guide blades (40), which enable an adaptation of a current cross-section from the outlet (10) to the turbine wheel (38).

2. The turbine arrangement according to claim 1, wherein the gas flow is the exhaust gas flow of a fuel cell.

3. The turbine arrangement according to claim 1, wherein the gas flow is the fresh air flow on the suction side of an internal combustion engine.

4. The turbine arrangement according to claim 1, wherein the adjustment of the slide bushing (48) is carried out by means of an axial shifting in relation to the wall opening (64).

5. The turbine arrangement according to claim 1, wherein the plurality of guide blades (40) are integrated on a rear wall (32) or are fixed on a rear wall (32) via an insertion plate (44).

6. The turbine arrangement according to claim 1, wherein the slide bushing (48) has a receiving chamber for the plurality of guide blades (40) on its edge (80) adjacent to the wall opening (64), said receiving chamber spanning the plurality of guide blades (40).

7. The turbine arrangement according to claim 6, wherein the receiving chamber is designed as an axially circumferential annular groove (82) or as a recess (40') complementary to the shape of the guide blades (40).

8. The turbine arrangement according to claim 1, wherein the slide bushing (48) has a radially circumferential annular groove (86) on its second edge (84), said annular groove being coupled to an adjustment device.

9. The turbine arrangement according to claim 8, wherein the adjustment device is designed having an adjustment fork (88) engaging into the radially circumferential annular groove (86).

10. The turbine arrangement according to claim 1, wherein the inner side of the slide bushing (48) is formed with positive engagement with the turbine housing (30) or an inner bushing (46).

11. The turbine arrangement according to claim 10, wherein an abutment (50) is formed on the turbine housing (30) or the inner bushing (46), said abutment limiting the adjustment of the slide bushing (48) via a complementary abutment (50').

12. A charging device (4) having a turbine arrangement (20) according to claim 1, wherein one or more compressors (12) are moreover provided for supplying air, wherein the compressor(s) are driven by the electric engine (18) attached on the shaft (16) of the turbine arrangement (20).

13. The charging device according to claim 12, wherein a control unit is moreover provided, which controls the adjustment device or the power output or consumption of the electric engine.

14. A turbine arrangement for controlling a gas flow, in particular for a fuel cell (2) or for an internal combustion engine (3), comprising an inlet (10), an adjustable slide bushing (48), an entry opening (43), wherein the gas flow supplied from the inlet (10) can be controlled by the adjustable slide bushing (48) covering the entry opening (43) to form a turbine wheel (38) arranged in a turbine housing (30) between a closed position and an open position, such that, in the closed position, the gas flow is throttled and, in the at least partially open position, a controllable proportion of the gas flow drives the turbine wheel (38) arranged on a shaft (22) of an electric engine (18) functioning as a generator for recuperating energy, wherein the slide bushing (48) releases a wall opening (64) in the turbine housing (30) above a predetermined value of the gas flow, such that a bypass channel emerges in order to guide gas flow past the turbine wheel (38) directly to an outlet opening (24), in which the slide bushing (48) has a radially circumferential annular groove (86) on its second edge (84), said annular groove being coupled to an adjustment device, in which the adjustment device is designed having an adjustment fork (88) engaging into the radially circumferential annular groove (86).

* * * * *